United States Patent
Wong et al.

(10) Patent No.: US 10,097,309 B2
(45) Date of Patent: Oct. 9, 2018

(54) USER EQUIPMENT AND METHOD TO REPORT CQI WHEN INTERFERENCE CANCELLATION IS SUPPORTED AT THE RECEIVER

(71) Applicant: Alcatel Lucent, Boulogne Billancourt (FR)

(72) Inventors: Shin Horng Wong, Swindon (GB); Matthew Baker, Swindon (GB)

(73) Assignee: Alcatel Lucent, Boulogne Billancourt (FR)

( * ) Notice: Subject to any disclaimer, the term of this patent is extended or adjusted under 35 U.S.C. 154(b) by 45 days.

(21) Appl. No.: 14/910,385

(22) PCT Filed: Jul. 21, 2014

(86) PCT No.: PCT/EP2014/001993
§ 371 (c)(1),
(2) Date: Feb. 5, 2016

(87) PCT Pub. No.: WO2015/018491
PCT Pub. Date: Feb. 12, 2015

(65) Prior Publication Data
US 2016/0191200 A1    Jun. 30, 2016

(30) Foreign Application Priority Data
Aug. 7, 2013 (EP) ..................... 13306134

(51) Int. Cl.
*H04W 4/00* (2018.01)
*H04L 1/00* (2006.01)
(Continued)

(52) U.S. Cl.
CPC ........ *H04L 1/0026* (2013.01); *H04L 27/2647* (2013.01); *H04W 16/32* (2013.01);
(Continued)

(58) Field of Classification Search
CPC .... H04L 1/0026; H04B 17/345; H04B 17/309
See application file for complete search history.

(56) References Cited

U.S. PATENT DOCUMENTS

| 9,088,327 B2* | 7/2015 | Xu ........................ H04B 1/1027 |
| 2013/0194938 A1* | 8/2013 | Immonen ............... H04B 1/525 370/252 |
| 2013/0265897 A1* | 10/2013 | Wu ....................... H04L 1/0003 370/252 |

FOREIGN PATENT DOCUMENTS

| EP | 1 895 680 A2 | 3/2008 |
| EP | 2757720 | 7/2014 |

(Continued)

OTHER PUBLICATIONS

QUALCOMM Europe, "Link Analysis of Layer Permutation and No Layer Permutation," 3rd Generation Partnership Project (3GPP), 3GPP TSG-RAN WG1 #46bis, R1-062974, pp. 1-7, XP050103443, Seoul, Korea, Oct. 9-13, 2006.

(Continued)

*Primary Examiner* — Shukri Taha
(74) *Attorney, Agent, or Firm* — Fay Sharpe LLP

(57) ABSTRACT

A user equipment method, user equipment and a computer program product are disclosed. The user equipment method comprises: determining a first indicator indicative of a potential throughput for a channel between the user equipment and a base station when using a network assist interference suppression scheme; determining a second indicator indicative of a potential throughput for the channel between the user equipment and the base station without using the network assist interference suppression scheme; calculating an effective indicator indicative of an effective potential throughput for the channel between the user equipment and the base station based on the first indicator and the second indicator; and transmitting the effective indicator to the base (Continued)

station. In this way, rather than transmitting only an indicator of the potential throughput when not using the network assist interference suppression scheme or only transmitting an indicator which indicates the throughput when using the network assist interference suppression scheme, instead an effective throughput is transmitted which may be based on both of these indicators and so is likely to be more stable. Also, by only transmitting a single throughput indicator, the need for additional signalling to carry those additional indicators is avoided, which enables an improved indicator to be provided using existing signalling.

12 Claims, 1 Drawing Sheet

(51) Int. Cl.
*H04L 27/26* (2006.01)
*H04W 16/32* (2009.01)
*H04W 72/04* (2009.01)
*H04W 24/10* (2009.01)

(52) U.S. Cl.
CPC ..... *H04W 72/042* (2013.01); *H04W 72/0413* (2013.01); *H04W 24/10* (2013.01)

(56) References Cited

FOREIGN PATENT DOCUMENTS

| | | |
|---|---|---|
| EP | 2787672 | 8/2014 |
| JP | 2008-61253 | 3/2008 |
| JP | 2012-515469 | 7/2012 |
| JP | 2013-539300 | 10/2013 |
| WO | WO 2010/081071 A1 | 7/2010 |

OTHER PUBLICATIONS

International Search Report for PCT/EP2014/001993 dated Oct. 7, 2014.

\* cited by examiner

USER EQUIPMENT AND METHOD TO REPORT CQI WHEN INTERFERENCE CANCELLATION IS SUPPORTED AT THE RECEIVER

FIELD OF THE INVENTION

The present invention relates to a user equipment method, user equipment and a computer program product.

BACKGROUND

Wireless telecommunication networks are known. In such networks, mobile communication devices (for example, mobile telephones) are operable to communicate with base stations provided by network providers.

In known wireless telecommunication networks, radio coverage is provided to network connectable devices, such as mobile telephones, or wireless devices such as tablets, within areas known as cells. A base station is located in each cell to provide radio coverage. Typically, network connectable devices in each cell are operable to receive information and data from a base station and to transmit information and data to a base station.

User equipment roam through the wireless communications network. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links.

Traditional base stations provide coverage in relatively large geographical areas and those cells are often referred to as macro cells. It is possible to provide a heterogeneous network (HetNet) where smaller-sized cells are provided within macro cells, as illustrated in FIG. 1. Such smaller sized cells are sometimes referred to as low-power nodes (LPN), micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator.

Although HetNet deployments may offer advantages, unexpected consequences of such deployments may occur. It is desired to address those consequences.

EP1895680 discloses a method for transmitting/receiving data in a multi-antenna system. The system calculates a rate of reception that it can obtain when applying a SIC (successive interference cancellation) technique and when applying a beamforming technique and it then selects the higher one of them and feeds the information back to the base station.

Qualcomm Europe "Link Analysis of Layer Permutation and No Layer Permutation", 3GPP draft; R1-062974, 3GPP, vol. RAN WG1 no. Seoul, 14 Oct. 2006, discloses two ways of determining a channel quality indicator CQI, one of which reflects the average SIC gain between layers and a one of which is a base layer CQI which reflects the SINR without SIC.

WO2010/081071 discloses different techniques for computing and reporting CQIs based on the UE capability and/or other factors.

SUMMARY

According to a first aspect, there is provided a user equipment method, comprising: determining a first indicator indicative of a potential throughput for a channel between said user equipment and a base station when using a network assist interference suppression scheme; determining a second indicator indicative of a potential throughput for said channel between said user equipment and said base station without using said network assist interference suppression scheme; determining a probability associated with successfully decoding transmissions received over said channel between said user equipment and said base station when using said network assist interference suppression scheme; calculating an effective indicator indicative of an effective potential throughput for said channel between said user equipment and said base station by combining said first indicator, said second indicator and said probability; and transmitting said effective indicator to said base station.

The first aspect recognises that Cell Range Expansion (CRE) is a well-known technique in HetNets where the handover of user equipment in the macro cell is biased towards the LPN by setting the Cell Individual Offset (CIO) for that the LPN. This creates a CRE region as shown in FIG. 1, where user equipment are attached to the LPN at a radio condition that is poorer than that used in a conventional non-biased handover. The user equipment in the CRE region suffer high downlink interference from the macro cell.

In order to overcome the high interference from the macro cell in the CRE region, a Network Assisted Interference Suppression/Cancellation (NAISC) is proposed. Here the network provides some demodulation information of the macro cell's transmission to the user equipment in the CRE region such that the user equipment can suppress or cancel this interference. This would improve the user equipment downlink throughput performance and allow for more aggressive CRE (i.e. larger CRE region) to offload more user equipment from the macro cell.

To fully utilise NAISC, the channel quality indication (CQI) reported by the user equipment should be based on post interference suppression/cancellation signal quality (i.e. the CQI achievable when utilising NAISC). The user equipment would report higher CQI leading to a higher transport block size (TBS) being scheduled by the macro base station. Since interference suppression/cancellation is not perfect, the CQI reports would fluctuate depending on whether the user equipment successfully suppresses/cancels the interference. A fluctuating CQI would make it difficult for the network to schedule the right TBS to the user equipment. Hence, it is desirable to overcome fluctuations in CQI reporting when user equipment is operating under NAISC.

Accordingly, a method for use by user equipment is provided. The method may comprise the step of determining a first indicator. The first indicator may indicate a potential throughput of a channel between the user equipment and a base station for transmissions when using a network assist interference suppression scheme. The method may also comprise the step of determining a second indicator. The second indicator may indicate a potential throughput of the channel between the user equipment and the base station when failing to use the network assist interference suppression scheme. The method may also comprise the step of calculating an effective indicator. The effective indicator may indicate an effective, equivalent or likely potential throughput for the channel. That effective throughput may be calculated based on the first indicator and the second indicator. That is to say, the effective indicator may be derived from both the first indicator and the second indicator. The method may also comprise the step of transmitting the effective indicator to the base station. In this way, rather than transmitting only an indicator of the potential throughput when not using the network assist interference suppression scheme (which would likely under-estimate throughput) or only transmitting an indicator which indicates the throughput when using the network assist interference suppression scheme (which would likely fluctuate considerably), instead an effective throughput is transmitted which may be based on both of these indicators and so is likely to be more stable. Also, by only transmitting a single throughput indicator, the need for additional signalling to carry those additional indicators is avoided, which enables an improved indicator to be provided using existing signalling.

The method comprises determining a probability associated with successfully decoding transmissions received over the channel between the user equipment and the base station when using the network assist interference suppression scheme. Hence, a probability or likelihood of the network assist interference suppression scheme being successful in decoding transmissions is determined. This enables an assessment of how likely the potential throughput will be when using the network assist interference suppression scheme, which may be used when calculating the effective potential throughput.

In one embodiment, the first indicator is determined by estimating a potential transport block size receivable based on signals received by the user equipment when using the network assist interference suppression scheme. Accordingly, signals received by the user equipment are used to estimate, in accordance with known techniques, a potential transport block size which is receivable by the user equipment when using the network assist interference suppression scheme. The first indicator may be determined or be derived using that potential transport block size.

In one embodiment, the step of determining the probability comprises comparing that proportion of transmissions successfully decoded against that proportion of transmissions unsuccessfully decoded over a period of time using the network assist interference suppression scheme. Accordingly, the periods within which the network assist interference suppression scheme is successful in decoding transmissions may be compared with the periods within which such decoding is unsuccessful, in order to calculate a probability of the transmissions being successfully decoded.

In one embodiment, the second indicator is determined by estimating a potential transport block size receivable based on signals received by the user equipment without using the network assist interference suppression scheme. Accordingly, the estimated transport block size may be determined or derived and the second indicator may provide an indicator which may be derived from that potential transport block size.

In one embodiment, the step of calculating the effective indicator comprises combining the first indicator and the second indicator. Accordingly, the effective indicator may be derived through a combination of the first indicator and the second indicator in order to provide an effective throughput which may be between these two values.

The step of calculating the effective indicator comprises combining the first indicator, the second indicator and the probability. Accordingly, the effective indicator may also utilise the probability in order to better estimate the effective throughput.

In one embodiment, the step of calculating the effective indicator comprises combining the first indicator and the second indicator in accordance with $$T_{effective} = P_{NAISC} T_{POST} + (1 - P_{NAISC}) T_{PRE}$$

where $T_{effective}$ is effective indicator, $P_{NAISC}$ is the probability, $T_{POST}$ is the first indicator and $T_{PRE}$ is the second indicator.

In one embodiment, the step of calculating the effective indicator comprises combining the first indicator and the second indicator in accordance with $$T_{effective} = P_{NAISC} T_{POST} + (1 - P_{NAISC}) T_{FAIL}$$

where $T_{effective}$ is effective indicator, $P_{NAISC}$ is the probability, $T_{POST}$ is the first indicator the and $T_{FAILURE}$ is the second indicator when the network assist interference suppression scheme is unsuccessful.

In one embodiment, the method comprises the step of setting the probability to zero when the user equipment operates without the network assist interference suppression scheme. Accordingly, when no network assist interference suppression scheme is utilised, the probability may be set to zero.

In one embodiment, the effective indicator comprises one of a channel quality indicator and a transport block size.

In one embodiment, the effective indicator comprises a single value representative of both the first indicator and the second indicator.

According to a second aspect, there is provided user equipment, comprising: determining logic operable to determine a first indicator indicative of a potential throughput for a channel between said user equipment and a base station when using a network assist interference suppression scheme and a second indicator indicative of a potential throughput for said channel between said user equipment and said base station without using said network assist interference suppression scheme, and to determine a probability associated with successfully decoding transmissions received over said channel between said user equipment and said base station when using said network assist interference suppression scheme; calculating logic operable to calculate an effective indicator indicative of an effective potential throughput for said channel between said user equipment and said base station by combining said first indicator, said second indicator and said probability; and transmission logic operable to transmit said effective indicator to said base station.

In one embodiment, the determining logic is operable to determine the first indicator by estimating a potential transport block size receivable based on signals received by the user equipment when using the network assist interference suppression scheme.

In one embodiment, the determining logic is operable to determine the probability by comparing that proportion of transmissions successfully decoded against that proportion of transmissions unsuccessfully decoded over a period of time using the network assist interference suppression scheme.

In one embodiment, the determining logic is operable to determine the second indicator by estimating a potential transport block size receivable based on signals received by the user equipment without using the network assist interference suppression scheme.

In one embodiment, the calculating logic is operable to calculate the effective indicator by combining the first indicator and the second indicator.

In one embodiment, the calculating logic is operable to calculate the effective indicator by combining the first indicator and the second indicator in accordance with $$T_{\mathit{effective}} = P_{\mathit{NAISC}} T_{\mathit{POST}} + (1 - P_{\mathit{NAISC}}) T_{\mathit{PRE}}$$

where $T_{\mathit{effective}}$ is effective indicator, $P_{\mathit{NAISC}}$ is the probability, $T_{\mathit{POST}}$ is the first indicator and $T_{\mathit{PRE}}$ is the second indicator.

In one embodiment, the calculating logic is operable to calculate the effective indicator by combining the first indicator and the second indicator in accordance with $$T_{\mathit{effective}} = P_{\mathit{NAISC}} T_{\mathit{POST}} + (1 - P_{\mathit{NAISC}}) T_{\mathit{FAIL}}$$

where $T_{\mathit{effective}}$ is effective indicator, $P_{\mathit{NAISC}}$ is the probability, $T_{\mathit{POST}}$ is the first indicator the and $T_{\mathit{FAIL}}$ is the second indicator when the network assist interference suppression scheme is unsuccessful.

In one embodiment, the calculating logic is operable to set the probability to zero when the user equipment operates without the network assist interference suppression scheme.

In one embodiment, the effective indicator comprises one of a channel quality indicator and a transport block size.

In one embodiment, the effective indicator comprises a single value representative of both the first indicator and the second indicator.

According to a third aspect, there is provided a computer program product operable, when executed on a computer, to perform the method steps of the first aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
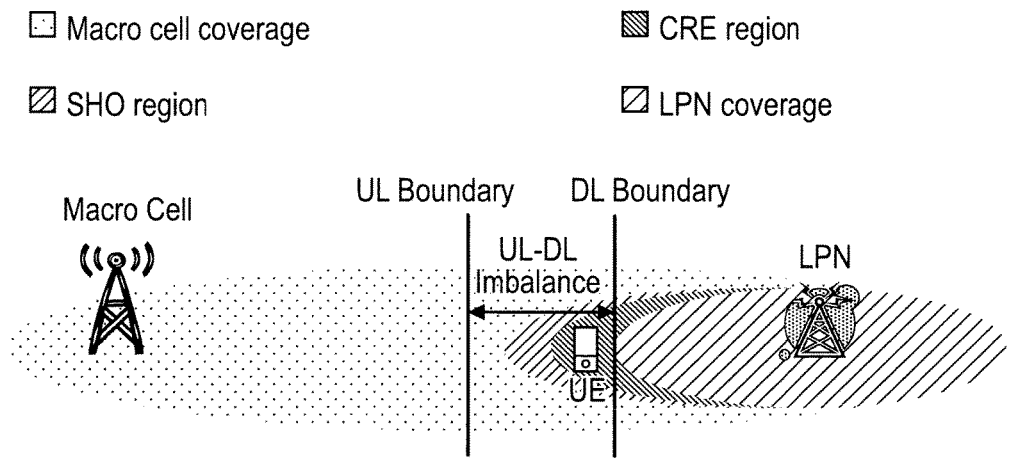
FIG. 1 illustrates a heterogeneous network.

Before discussing the embodiments in any more detail, first an overview will be provided. As mentioned above, embodiments recognise that because interference suppression/cancellation is not perfect, the potential throughput indicator provided to a serving base station will fluctuate, depending on whether the user equipment is able to suppress or cancel interference or not. Providing such a fluctuating throughput indicator would make it difficult for the network to schedule data at the correct rate to the user equipment. Accordingly, embodiments seek to provide a convenient mechanism for dealing with such fluctuations when reporting throughput to the network. Rather than providing two different reports, one indicating potential throughput when interference suppression/cancellation is operating and one for when it is not (which would require additional overhead to carry both of these items of information), instead, a single indicator is provided which can be transmitted to the base station using existing techniques. Although a variety of ways can be used to combine the two throughput indicators together, one particularly effective approach is to take into account the probability of successful interference suppression/cancellation when calculating the throughput indicator. For example, a probability can be associated with the throughput indicator with interference suppression/cancellation. When the interference suppression/cancellation is proving to be effective, then the probability associated with that throughput indication can be higher. However, when the interference cancellation/suppression proves to be ineffective, then the probability associated with that throughput indicator will be lower. In other words, when the probability associated with the throughput when using interference suppression/cancellation is high, it is likely that the throughput for the user equipment will be close to that of the throughput experienced when using interference suppression/cancellation. However, when the probability reduces, the likely throughput will also reduce until, when the probability of being able to successfully decode any data using interference suppression/cancellation reduces to zero, the throughput will generally at best match that without using interference suppression/cancellation. Hence, it can be seen that the effective likely throughput will vary between that provided when no interference suppression/cancellation is used up to that possible with all data being successfully decoded using interference suppression/cancellation, and will vary between these two based on the probability of interference suppression/cancellation being able to effectively decode the received data. It is possible, using this information, to then calculate an effective throughput indicator which can be provided to the base station in order that it can provide data to the user equipment at a rate at which the user equipment is likely to be able to effectively receive and decode that data.

Embodiments utilise a Channel Quality Indicator (CQI) and take the probability of successful interference suppression/cancellation into account when calculating the CQI. In this way, user equipment that operates with network assisted interference suppression/cancellation need only report a single CQI and no new CQI feedback format is required. Instead, existing techniques for reporting CQI may be continued to be utilised. Also, when network assisted interference suppression/cancellation is switched off, the user equipment would remove the probability of successful interference suppression/cancellation when calculating the CQI, and so would continue to calculate the CQI using existing techniques.

Example Operation

Although embodiments are described with reference to a Universal Mobile Telephone System (UMTS) network, it will be appreciated that this approach may also be utilised in other networks such as, for example, a Long Term Evolution (LTE) network.

Existing user equipment calculates a CQI assuming a total received power on all HS-PDSCH codes of $P_{HSPDSCH}$. This power is assumed to be spread evenly among the HS-PDSCH codes. Based on an unrestricted observation interval (such as a number of frames, or longer), the user equipment then reports the highest CQI corresponding to a single HS-DSCH sub-frame formatted with the Transport Block Size (TBS), number of HS-PDSCH codes and modulation that it could receive with a 0.1 (i.e. 10%) error probability, as defined in 3GPP TS 25.214.

In order to provide a single throughput indicator (such as a CQI or TBS) to the base station, the user equipment calculates two different throughput indicators over a period of time, based on measurements made by the user equipment. For example, the user equipment uses known techniques to measure the current radio conditions, as well as using details of the user equipment's receiver capabilities, together with the received signal strength of transmissions from the base station. Using these measured values, together with interference suppression/cancellation information provided by the network, the user equipment can then determine, using known techniques, an estimated throughput (such as a CQI or TBS) when using and when not using network-assisted interference suppression/cancellation.

Figure 2:
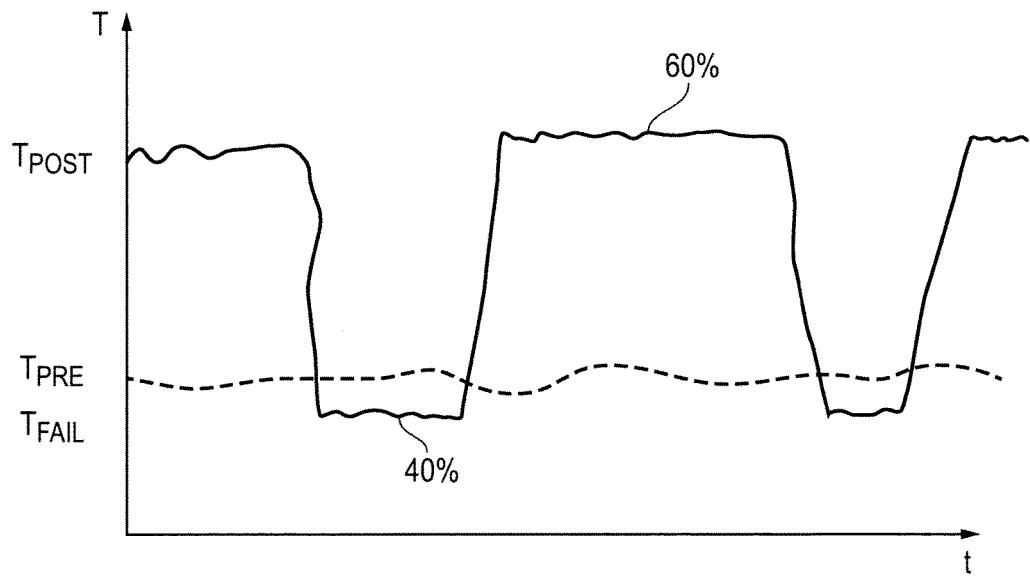
FIG. 2 illustrates schematically estimated likely or probable throughput values calculated over a period of time by the user equipment when using and when not using network-assisted interference suppression/cancellation.

FIG. 2 illustrates schematically estimated likely or probable throughput values calculated over a period of time by the user equipment when using and when not using network-assisted interference suppression/cancellation. $T_{PRE}$ is the throughput (expressed typically as a CQI, TBS or some other indicator) that the user equipment can achieve without interference suppression/cancellation with a 0.1 error probability. $T_{POST}$ is the throughput (expressed typically as a CQI, TBS or some other indicator) that the user equipment can achieve if interference suppression/cancellation is successful with a 0.1 error probability. $T_{FAIL}$ is the throughout (expressed typically as a CQI, TBS or some other indicator) that the user equipment can achieve if interference suppression/cancellation is unsuccessful.

The user equipment estimates over an unrestricted observation interval the probability $P_{NAISC}$ of successful interference suppression/cancellation. This probability can be determined by comparing the relative time periods between successful and unsuccessful interference suppression/cancellation. For example, where the total time during the observation period that the interference suppression/cancellation is successful amounts to 60% of the total time period, then $P_{NAISC}$ will be 0.6.

With these two sets of values, the user equipment can then calculate an effective probable throughput value which can be indicated to the base station. As can be seen in FIG. 2, when the amount of time that interference suppression/cancellation is successful increases, the probable amount of throughput also increases. However, when the proportion of time spent where interference suppression/cancellation is unsuccessful decreases, it can be seen that the throughput drops to that with no interference suppression/cancellation, or may be even lower if $T_{FAIL}$ falls below $T_{PRE}$. The user equipment utilises this information to derive a single, effective throughput value to indicate to the base station, which is derived from this information. Although there are a variety of different ways to calculate this effective throughput value, one embodiment calculates the effective throughput in accordance with Equation 1.

$$T_{effective} = P_{NAISC} T_{POST} + (1 - P_{NAISC}) T_{PRE} \qquad \text{Equation 1}$$

In another embodiment, the effective throughput may be calculated in accordance with Equation 2.

$$T_{effective} = P_{NAISC} T_{POST} + (1 - P_{NAISC}) T_{FAIL} \qquad \text{Equation 2}$$

It will be appreciated that embodiments may also calculate the effective throughput based on a combination of Equations 1 and 2.

Where the user equipment makes measurements and the throughput indicator is a transport block size, then a CQI that corresponds to the effective transport block size (and the corresponding number of HS-PDSCH codes and modulation) is reported to the base station.

It will be appreciated that the probability $P_{NAISC}$ is dependent upon user equipment implementation and the performance requirements for network-assisted interference suppression/cancellation (which is related to $P_{NAISC}$) would therefore typically need to be specified.

It will also be appreciated that when network-assisted interference suppression/cancellation is switched off, the probability $P_{NAISC}$ would become zero. Using the equations above, $T_{EFFECTIVE} = T_{PRE}$ under those circumstances and so the user equipment reverts back to the existing legacy method to calculate the throughput.

Accordingly, it can be seen that embodiments provide a technique which avoids fluctuation CQI when the user equipment is operating under network-assisted interference suppression/cancellation. This approach requires only a single CQI to be sent to the base station, thereby avoiding any new CQI feedback format in order to send multiple CQIs to the base station.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A user equipment method, comprising:
   determining a first indicator indicative of a throughput for a channel between said user equipment and a base station when using a network assist interference suppression scheme;
   determining a second indicator indicative of a throughput for said channel between said user equipment and said base station without using said network assist interference suppression scheme;
   determining a probability associated with successfully decoding transmissions received over said channel between said user equipment and said base station when using said network assist interference suppression scheme;
   calculating a third indicator indicative of a throughput for said channel between said user equipment and said base station by combining said first indicator, said second indicator and said probability;
   transmitting said third indicator to said base station;
   receiving, from said base station, a transport block size (TBS) being scheduled by said base station based on the third indicator; and
   decoding data transmissions received from the base station using the received transport block size (TBS);
   wherein said user equipment reduces interference to improve downlink throughput based on the third indicator.

2. The method of claim 1, wherein said first indicator is determined by estimating a transport block size receivable based on signals received by said user equipment when using said network assist interference suppression scheme.

3. The method of claim 1, wherein said step of determining said probability comprises comparing that proportion of transmissions successfully decoded against that proportion of transmissions unsuccessfully decoded over a period of time using said network assist interference suppression scheme.

4. The method of claim 1, wherein said second indicator is determined by estimating a transport block size receivable based on signals received by said user equipment without using said network assist interference suppression scheme.

5. The method of claim 1, wherein said step of calculating said third indicator comprises combining said first indicator and said second indicator.

6. The method of claim 1, wherein said step of calculating said third indicator comprises combining said first indicator and said second indicator in accordance with $$T_{effective} = P_{NAISC} T_{POST} + (1 - P_{NAISC}) T_{PRE}$$

where $T_{effective}$ is effective the third indicator, $P_{NAISC}$ is said probability, $T_{POST}$ is said first indicator and $T_{PRE}$ is said second indicator.

7. The method of claim 1, wherein said step of calculating said third indicator comprises combining said first indicator and said second indicator in accordance with $$T_{effective} = P_{NAISC} T_{POST} + (1 - P_{NAISC}) T_{FAIL}$$

where $T_{effective}$ is the third indicator, $P_{NAISC}$ is said probability, $T_{POST}$ is said first indicator and $T_{FAIL}$ is said second indicator when said network assist interference suppression scheme is unsuccessful.

8. The method of claim 1, comprising the step of setting said probability to zero when said user equipment operates without said network assist interference suppression scheme.

9. The method of claim 1, wherein said third indicator comprises one of a channel quality indicator and a transport block size.

10. The method of claim 1, wherein said third indicator comprises a single value representative of both said first indicator and said second indicator.

11. User equipment, comprising:
    determining logic configured to determine a first indicator indicative of a throughput for a channel between said user equipment and a base station when using a network assist interference suppression scheme and a second indicator indicative of a throughput for said channel between said user equipment and said base station without using said network assist interference suppression scheme, and to determine a probability associated with successfully decoding transmissions received over said channel between said user equipment and said base station when using said network assist interference suppression scheme;
    calculating logic configured to calculate a third indicator indicative of throughput for said channel between said user equipment and said base station by combining said first indicator, said second indicator and said probability; and
    transmission logic configured to transmit said third indicator to said base station;
    reception logic configured to receive, from said base station, a transport block size (TBS) scheduled by said base station based on the third indicator; and
    decoding logic configured to decode data transmissions received from the base station using the received transport block size (TBS);
    wherein said user equipment is configured to reduce interference to improve downlink throughput based on the third indicator.

12. A non-transitory computer readable medium with executable instructions stored thereon which, when executed by a processor, cause the processor to perform the method of claim 1.

* * * * *